United States Patent Office 3,113,290
Patented Dec. 3, 1963

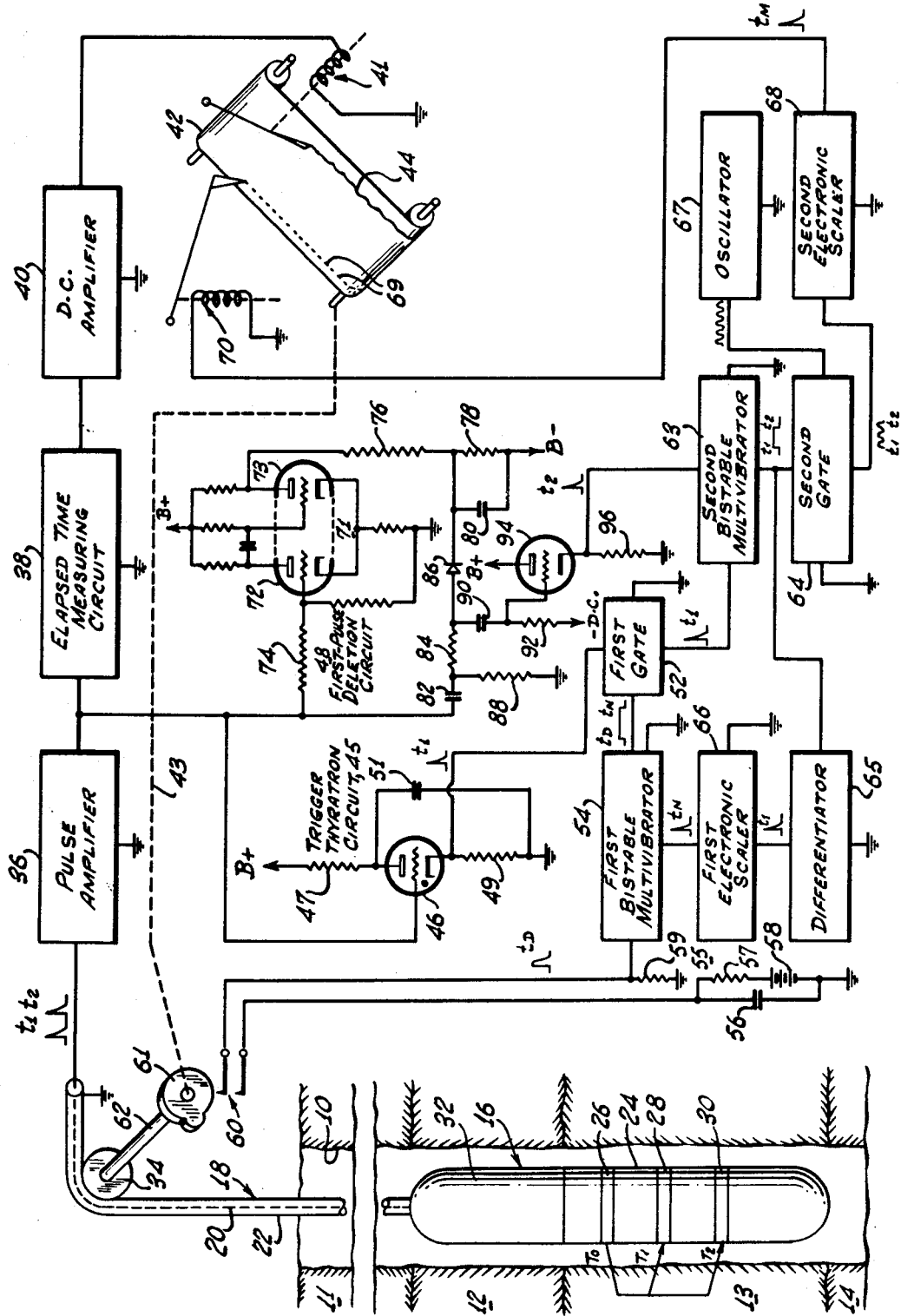

3,113,290
ACOUSTICAL WELL LOGGING
Hugh O. Walker, Jr., Houston, Tex., assignor to Texaco Inc., New York, N.Y., a corporation of Delaware
Filed Dec. 3, 1959, Ser. No. 856,952
4 Claims. (Cl. 340—18)

This invention relates to well logging and, more particularly, to acoustical well logging.

Systems for producing logs of the velocity of sound waves passing through subsurface formations utilize an exploring unit containing at least two spaced apart transducers. The velocity logging systems determine interval velocity by measuring the time required for an elastic wave to travel through the formations near the borehole wall the distance separating the two transducers, which may be an acoustic pulse transmitting transducer and a receiving transducer but which, preferably, are two receiving transducers. For a given transducer separation the velocity is inversely proportional to the time of travel. The measured time of travel may be converted to a convenient scale by appropriate electronic circuits to be displayed on a chart recorder as velocity versus borehole depth. The time measurements may be made at some convenient rate such as 20 or 30 times per second.

In accordance with the present invention a system is provided which makes use of the time determinations which are the basis of ascertaining the acoustic velocities. These time determinations are added in a cumulative manner in accordance with the present invention so as to record seismic wave travel time as a function of borehole depth.

In accordance with one aspect of this invention, at depth intervals corresponding to the transducer spacing, which, preferably, may be a distance of one foot to five feet, the depth measuring device associated with the logging cable trips a relay or switch and thereby arms an electronic sampling device. The sampling device once armed is sensitive to a wave arriving at one of the transducers. At the instant that the elastic wave arrives at the one transducer the sampling device couples a signal generator, for example, a one megacycle signal generator, to a counting device or electronic scaler unit which counts the cycles from the generator as they are received at the counting device or unit. The elastic wave upon arrival at the other of the transducers disconnects, for example, by means of a gate, the one megacycle signal generator from the counting device or unit. The number of cycles of the one megacycle signal produced during the time of travel of the acoustic pulse between the two transducers is a measure of the formation travel time for the particular transducer spacing. This number of cycles or time in microseconds is retained, registered or stored in the counting device. At each depth interval corresponding to the transducer spacing the above procedure is repeated so that as each interval is traversed by the exploring unit or sonde of the system an additional time measurement is added to the time already stored in the counting device. Means are provided to display the information contained in the counting device versus depth directly on a chart paper and, preferably, simultaneously with the recording of acoustical velocity.

For a better understanding of the invention, reference may be had to the accompanying drawing in which the figure is a diagram illustrating a cross-sectional view of a borehole extending through the earth's surface and having suspended therein the subsurface logging tool of a preferred embodiment of the acoustical well logging system of the present invention the surface equipment of the logging system being shown partly in block form and partly in the form of a schematic circuit diagram.

Referring in more detail to the figure of the drawing, a borehole 10 containing a borehole liquid, for example, a borehole drilling mud, is shown traversing a plurality of subsurface formations 11, 12, 13 and 14, the accoustical velocity and the total acoustic pulse travel time through which it is desired to determine. Disposed within the borehole is an exploring unit or elongated total 16 supported by a single conductor cable 18, the single conductor cable 18 including a central conductor 20, preferably made of copper or other highly conductive metal, and an outer sheath 22 made of steel strands having a strength sufficient to support the exploring unit 16 and its own weight in the borehole. The exploring unit 16 has an acoustical section 24 in the lower end thereof in which a transmitting transducer 26, a first receiving transducer 28 and a second receiving transducer 30 are contained. Each of the transducers is, preferably, of the lead zirconate titanate type or of the barium titanate type. The walls and the interior of the acoustical section 24 of the exploring unit 16 are made of a material in which the acoustical velocity of sound is not greater than the acoustical velocity of sound passing through the fluid in the borehole 10, preferably, a velocity which is less than 5,000 feet per second. The upper section of the exploring unit 16 is an electronic section 32 wherein the necessary exploring unit electronic circuitry is housed.

The electronic section 32 may house means for actuating the acoustical transmitting transducer 26 at a constant repetition rate, for example, 20 to 30 times per second, and means for applying the electric pulses from the first and second receiving transducers to the single conductor cable 18.

The single conductor cable 18 passes over a cable measuring device 34 disposed at the earth's surface. The central conductor 20 of the single conductor cable 18 is connected to the input of a pulse amplifier 36 and the sheath 22 is connected to ground. The output of the pulse amplifier 36 is connected to an elapsed time measuring circuit 38 which measures the elapsed time between pulses $t_1$ and $t_2$ derived from the first and second receiving transducers 28 and 30. The output of the elapsed time measuring circuit 38 is applied through a direct current voltage amplifier 40 to a marking instrument 41 of a recorder 42 driven by the cable measuring device 34 through coupling means 43 to provide a trace 44 which indicates acoustical velocity as a function of depth. The portion of my system described heretofore is described and illustrated in more detail in the commonly assigned copending U.S. applications, Serial No. 842,929, filed September 28, 1959, by K. D. Savage and L. E. Elliott, Jr., now U.S. Patent No. 3,071,203 and Serial No. 574,844 filed March 29, 1956, by R. J. Loofburrow, now U.S. Patent No. 2,931,455.

In accordance with an important aspect of the present invention the pulses $t_1$ and $t_2$ are separated from each other before they are applied to the means for measuring the total acoustic pulse travel time. A first circuit is provided to carry only the pulse $t_1$ and a second circuit is provided to carry only the pulse $t_2$. In order to separate the pulses $t_1$ and $t_2$, a trigger thyratron circuit 45 and a first-pulse deletion circuit 48 are provided.

The trigger thyratron circuit 45 comprises a thyratron tube 46, an anode resistor 47 connected between the anode of the thyratron tube 46 and a B+ supply, a cathode resistor 49 connected between the cathode of the thyratron tube 46 and ground and an energy storage capacitor 51 connected between the anode of the tube 46 and ground.

The cathode of the thyratron tube 46 is connected to a first gate 52, which is preferably a diode arrangement. The output from a first bistable multivibrator 54 also is applied to the first gate 52. An input circuit 55 comprising a storage capacitor 56, a first resistor 57 and a voltage source 58 connected serially across the storage capacitor 56, a second resistor 59 and a switch 60, the second resistor 59 being connected across the storage capacitor 56 through the switch 60 and directly across an input of the first bistable multivibrator 54. A cam 61 suitably coupled to the depth measuring device 34, for example, by means of a shaft 62, is formed so as to close the switch 60 each time that the exploring unit 16 is moved a distance equal to the distance between the two receiving transducers 28 and 30. A second bistable multivibrator 63 is connected to the output of the first gate 52. The output of the second bistable multivibrator 63 is applied to a second gate 64 which may be similar to the first gate 52 and also to a differentiator 65. A first electronic scaler 66 is connected between the output of the differentiator 65 and an input of the first bistable multivibrator 54. An oscillator 67 also is connected to the second gate 64 so as to pass therethrough a signal, for example, a one megacycle wave, when the gate 64 is in its open condition, to a second electronic scaler or counting device 68. Output pulses $t_M$ from the second electronic scaler 68 are recorded in the recorder 42 as a series of spaced dots 69 by means of a conventional marker relay 70.

The first-pulse deletion circuit 48 comprises a one-shot multivibrator 71 having a first triode section 72 and a second triode section 73. The output from the pulse amplifier 36 is connected to the control grid of the first triode section 72 through a coupling resistor 74. The anode of the second triode section 73 is connected to a first resistor 76 connected in series with a parallel combination of a second resistor 78 and a capacitor 80 to a B— supply. Also connected to the output of the pulse amplifier 36 through a coupling capacitor 82 is a load resistor 84. A silicon diode 86, which is preferably a 1N646, is connected between the first load resistor 84 and the common point between the first resistor 76 and the second resistor 78. A second load resistor 88 is connected between the common point of the first coupling capacitor 82 and the first load resistor 84 and ground. A second coupling capacitor 90 is connected between the common point of the first load resistor 84 and the silicon diode 86 and a grid resistor 92. The grid resistor 92 is connected between the control grid of a cathode follower 94 and a negative direct current potential or bias source. The anode of the cathode follower 94 is connected directly to the B+ supply and the cathode of the cathode follower 94 is connected through a cathode resistor 96 to ground. The cathode of the cathode follower 94 is connected to an input of the second bistable multivibrator 63.

In the operation of the system of the present invention an acoustic pulse $T_0$ is produced by the transmitting transducer 26. The acoustic pulse $T_0$ travels through the borehole fluid into the surrounding subsurface formation, for example, formation 13, where a portion of the acoustic pulse $T_0$ is refracted toward the first and second receiving transducers 28 and 30. A portion $T_1$ of the refracted acoustic energy is received at the first receiving transducer 28 which in response thereto produces an electric pulse $t_1$. Another portion $T_2$ of the refracted acoustic pulse is received at a later time at the second receiving transducer 30 which in response thereto produces an electric pulse $t_2$. The electric pulses $t_1$ and $t_2$ are applied to the single conductor 20 of the cable 18 which transmits them to the pulse amplifier 36 located at the earth's surface. The amplified pulses are then applied to the elapsed time measuring circuit 38 which produces a direct current voltage indicative of the magnitude of the time difference between the two pulses $t_1$ and $t_2$, for example, as in the manner described in the hereinbefore mentioned copending applications. The output voltage from the elapsed time measuring circuit 38 is amplified in the direct current voltage amplifier 40 and applied to the marking instrument 41 to be recorded in the recorder 42 as a continuous trace 44 which indicates the time of travel or velocity, since the distance is known, of acoustic pulses as a function of depth.

The two pulses $t_1$ and $t_2$ also are applied, from the output of the pulse amplifier 36 to the trigger thyratron circuit 45. The first pulse $t_1$ triggers or fires the thyratron tube 46 to discharge the storage capacitor 51 through the cathode resistor 49 to produce a voltage across the cathode resistor 49 corresponding to pulse $t_1$. The values of the capacitor 51 and the anode resistor 47 are chosen so that a substantial portion of the cycle between successive acoustic pulses $T_0$ is required to recharge the capacitor 51. Since all or substantially all of the energy from the capacitor 51 has been discharged by pulse $t_1$, the succeeding pulse $t_2$ will not be able to again fire the thyratron 46. Accordingly, only $t_1$ pulses will pass through the trigger thyratron circuit 45 to the first gate 52 which has a normally closed condition.

The electric pulses $t_1$ and $t_2$ from the amplifier 36, in addition to being applied to the elapsed time measuring circuit 38 and the trigger thyratron circuit 45, also are applied to the first-pulse deletion circuit 48 which deletes pulse $t_1$ and passes pulse $t_2$ to the second bistable multivibration 63. To accomplish this result, the first triode section 72 of the second multivibrator 71 of the first-pulse deletion circuit 48 is designed to be in a normally nonconducting condition and the second triode section 73 of the second multivibrator 71 in a normally conducting condition. When the first pulse $t_1$ is applied to the control grid of the first triode section 72, the first triode section 72 is placed in a conducting condition and the second triode section 73 then becomes non-conducting. The voltage at the anode of the second triode section 73 thus begins to increase to form a positive going pulse. The time constant of the multivibrator 71 is such that the positive going pulse at the anode of the second triode section 73 has a duration of approximately 1000 microseconds. The pulse $t_1$ from the pulse amplifier 36, in addition to being applied to the second multivibrator 71 of the first-pulse deletion circuit 48, also is applied through the coupling capacitor 82 to the first load resistor 84 and then through the normally conducting silicon diode 86 and the capacitor 80 to ground through the B— supply. The silicon diode 86 and the capacitor 80 are very low impedances for the pulse $t_1$ and, therefore, the voltage at the common point between the load resistor 84 and the silicon diode 86 is very small. The voltage at this common point is not of sufficient magnitude and polarity to produce at the output of the cathode follower 94 a voltage capable of actuating the second bistable multivibrator 63. Accordingly, it can be seen that pulse $t_1$ does not pass through the first-pulse deletion circuit 48 to the second bistable multivibrator 63. Prior to the time that the pulse $t_2$ from the pulse amplifier 36 is applied to the first load resistor 84 through the coupling capacitor 82, the silicon diode 86 is rendered nonconductive by the positive pulse from the anode of the second triode section 73 of the one-shot multivibrator 71. Accordingly, pulse $t_2$ will pass through the coupling condenser 90 to the control grid of the cathode follower 94 to appear across the cathode resistor 96 of the cathode follower 94. The second load resistor 88 is provided to complete the direct current path through the silicon diode 86 while that diode is in its conducting condition. The negative direct current or bias potential applied to the control grid of the cathode follower 94 has a value sufficiently great so as to prevent any portion of the pulse $t_1$ from passing through the cathode follower 94 while permitting pulse $t_2$ to pass through to the second bistable multivibrator 63. Accordingly, it can be seen that only the $t_2$ pulses are applied to the second bistable multivibrator 63 through the cathode follower 94.

The normally closed first gate 52 is opened by a positive voltage wave from the output of the first bistable multivibrator 54 which is initiated when the cam 61 closes switch 60 applying the voltage at the storage capacitor 56 of the input circuit 55 to the input of the first bistable multivibrator 54 in the form of a pulse $t_D$. Assuming in the interest of simplicity, that the first electronic scaler 66 is operating at a 1:1 ratio, that is, that for each pulse applied to the first scaler 66 a corresponding pulse is produced at the output thereof, the positive voltage wave from the output of the first bistable multivibrator 54 may be terminated anytime after the first $t_1$ pulse passes through the first gate 52 and before a second $t_1$ pulse is produced at the output of the trigger thyratron circuit 45. Accordingly, the positive voltage wave from the output of the first bistable multivibrator 54 is terminated conveniently by merely differentiating the positive square wave from the second bistable multivibrator 63, which square wave is initiated in response to the pulse $t_1$ after passing through the first gate 52. Thus, it can be seen that the duration of the positive voltage wave from the output of the first bistable multivibrator 54 is defined by the pulses $t_D$ and $t_1$. The positive square wave from the output of the second bistable multivibrator 63 is terminated when the pulse $t_2$ from the cathode follower 94 is applied thereto. Therefore, the second gate 64 is open during the time interval between $t_1$ and $t_2$ and, thus, the signal from the oscillator 67 is applied to the second electronic scaler 68 only during the time interval between $t_1$ and $t_2$ which is the time interval during which the acoustic pulse generated at the transmitting transducer 26 is traveling between the first and second receiving transducers 28 and 30. The second electronic scaler 68 may be designed so that each of the pulses $t_M$ from the output thereof represents any convenient number of waves applied thereto from the oscillator 67 or accumulated time increase, e.g., .5 or 1 millisecond. Since the recorder 42 is driven by the cable measuring device 34 the spacing between successive dots 69 which are produced by the pulses $t_M$ is an indication of the distance traveled by acoustic energy through one or more subsurface formations. In zones of high velocity the dots 69 are more widely spaced apart than in zones of low velocity. The total travel time between any two depths may be obtained merely by counting the number of dots 69 produced while logging between the two depths.

The time constant of the storage capacitor 56 and the second resistor 59 is preferably of the order of ten microseconds so that a sharp voltage spike is applied to the first multivibrator 54. The resistance value of the first resistor 57 is selected so that the charging capacitor 56 is recharged to the voltage of the voltage source 58 before a revolution of the cam 61 is completed. Thus, it can be seen that the waves from the oscillator 67 are applied to the second electronic scaler 68 only during the interval of time between the first pair of pulses $t_1$ and $t_3$ following the closing of the switch 60. Each time that the cam 61 completes one revolution, the switch 60 closes and a measurement of the time interval between the two pulses $t_1$ and $t_2$ is made. This interval of time is counted and stored temporarily in the second electronic scaler 68 and then indicated in recorder 42. Therefore, at each depth interval corresponding to the acoustic receiver spacing the above procedure is repeated so that as each interval is traversed by the exploring unit 16, an additional time measurement is added to the time already stored in the second electronic scaler 68 or indicated in the recorder 42. As illustrated in the figure of the drawing, the recorder 42 is provided preferably with means to display the travel time information directly on the chart paper simultaneously with the display of the acoustic velocity as a function of depth. Although the marker relay 70 is illustrated in the figure of the drawing, anyone of several known schemes may be employed to record total pulse travel time against depth.

The operation of the system has been described based on the assumption that the first electronic scaler 66 has been operating on a 1:1 ratio, or alternatively, without the use of the first scaler 66. It should be understood that the system of the present invention may be operated preferably with the first scaler 66 having a ratio of, e.g., 10:1 instead of 1:1 and adjusting the second electronic scaler so as to divide its output by 10, or in some other way compensate for the change in the ratio of the first electronics scaler 66, such as by noting that the space between successive dots 69 represents only one-tenth of the unit of time previously used. The advantage of increasing the ratio in the first electronic scaler 66 is that in the event that the pulses $t_1$ and $t_2$ are spaced by an erroneous time interval due to, e.g., hole wash-outs or noise, the error in recorded travel time will be greatly decreased since the spacing between the other nine pairs of pulses $t_1$ and $t_2$ may be accurate to provide an average value which is much nearer to the true value of travel time. The pulse $t_N$ from the output of the first electronic scaler 66 may represent any number of $t_1$ pulses applied to the first scaler 66 up to the number of acoustic pulses which are generated by the transmitting transducer 26 during a traverse of a segment of the borehole equal to the distance between the two receiving transducers 28 and 30. Since this number of acoustic pulses is dependent upon the logging speed, the ratios of the first and second electronic scalers 66 and 68 can be automatically controlled by coupling them to the cable measuring device 34. It should be understood that the first and second electronic scalers 66 and 68 may be any known suitable type.

Although the acoustical system of the present invention has been described in detail as a two receiver system, it should be understood that the principles of the present invention also may be incorporated in one receiver acoustical velocity logging systems by utilizing the time of travel of an acoustic pulse between a transmitting transducer and a receiving transducer. Furthermore, it should be understood that the present invention may be used with acoustical systems employing a logging cable having a plurality of conductors, for example, systems wherein each transducer is coupled to a separate conductor of the logging cable.

Obviously, many modifications and variations of the invention, as hereinbefore set forth, may be made without departing from the spirit and scope thereof, and therefore only such limitations should be imposed as are indicated in the appended claims.

I claim:

1. An acoustical borehole logging system comprising means for producing electric signal pulses having a time separation corresponding to the time of travel of an acoustic wave through each of a plurality of successive equal distances in subsurface strata along the traverse of the borehole, elapsed time measuring means having an input coupled to and controlled by the output of said means for producing electric pulses for producing at an output thereof a signal having a characteristic whose magnitude is a function of the time separation between said electric pulses, a parallel trace recorder having first and second input channels controlling separate parallel trace recording channels for recording logging signals in correlation with the depth of the logged strata, the output of said elapsed time measuring means being coupled to the first input channel of said recorder, an oscillator for producing a signal having a predetermined frequency of operation at an output thereof, means comprising a scaler having an input and an output, said scaler output being operatively coupled to the output of said oscillator, said scaler including means for producing an output signal having a characteristic indicative of a predetermined number of cycles of operation of said oscillator, the output of said scaler being coupled to the second input channel of said recorder for recording the occurrence of said scaler signal characteristic in correlation with the record of the signal whose magnitude is a function of the time separation between said electric pulse and the depth of the logged strata, and gating means operatively coupled between the output of said oscillator and the input of said scaler, gate pulse producing means having an input and an output, the input of said gate pulse producing means being operatively coupled to and controlled by the output of said means for producing electric signal pulses for producing a gating pulse having a duration corresponding to said time separation of said electric pulses, said gating means being operatively coupled to and controlled by the output of said gate pulse producing means and responsive thereto for controlling the output of said oscillator coupled to said scaler, whereby the number of output signal cycles coupled from said oscillator to said scaler is determined by the time of travel of the acoustic waves through the successive distances in the subsurface strata.

2. A system for producing an acoustical log of subsurface strata traversed by a borehole which comprises an exploring unit, means for moving said exploring unit through said borehole, means operatively associated with said exploring unit for periodically producing acoustic pulses for travel through the subsurface strata, means operatively associated with said exploring unit for producing first and second electric pulses separated from one another by a time interval indicative of the time of travel of each of said acoustic pulses between two points on said exploring unit spaced apart a predetermined distance, a transmission line, means operatively associated with said exploring unit for applying said first and second pulses to one end of said transmission line, pulse separating means coupled to the opposite end of said transmission line for producing at a first output thereof each of said first pulses and at a second output thereof each of said second pulses, a first normally closed gate having a first input coupled to the first output of said pulse separating means and a first bistable multivibrator having an output coupled to a second input of said first gate, means operatively associated with the means for moving said exploring unit through said borehole and responsive to the depth of said unit in the borehole for applying a trigger pulse to said first bistable multivibrator each time that said exploring unit moves a distance equal to said predetermined distance, a second bistable multivibrator having a first input coupled to the output of said first gate, means coupled to the output of said second bistable multivibrator for differentiating the output of said second bistable multivibrator, means for coupling the output of said differentiating means to said first bistable multivibrator, means for coupling the second output of said pulse separating means to a second input of said second bistable multivibrator, a second normally closed gate having an input coupled to the output of said second bistable multivibrator, an oscillator coupled to a second input of said second gate, and a recording device coupled to the output of said second gate.

3. A system as defined in claim 2 wherein a scaler unit is coupled between the output of said second gate and said recording device.

4. An acoustical well logging system comprising means for producing successive spaced-apart acoustic pulses for travel through the subsurface strata in the vicinity of a borehole between two points spaced apart a given distance in the borehole, a subsurface logging instrument adapted to be passed through the borehole adjacent the strata being logged, said instrument including means responsive to the occurrence of said acoustic pulses at said points for producing successive spaced apart pairs of first and second electric pulses, the respective pulses of each of said pairs of electric pulses having a time separation corresponding to the time of travel of an acoustic pulse between said two points, a transmission line having one end coupled to said means for producing electric pulses and the other end thereof coupled to surface signal translation equipment, said surface signal translation equipment comprising means for separating the respective first and second electric pulses of each of said pairs of pulses from one another comprising a trigger circuit and a first-pulse deletion circuit, said trigger circuit having an input and an output, said trigger circuit input being coupled to said transmission line whereby said first and second electric pulses of each pair thereof are coupled thereto, said trigger circuit having a characteristic recovery time which is longer than a predetermined maximum anticipated time separation between said first and second electric pulses and which is shorter than a predetermined time separation between successive pairs of said first and second electric pulses, whereby the output of said trigger circuit is responsive only to the first pulse of each pair of said electric pulses coupled to said trigger input, said first-pulse deletion circuit having an input and an output, said first-pulse deletion circuit input being coupled to said transmission line whereby said first and second electric pulses of each pair thereof are coupled thereto, said first-pulse deletion circuit having an output circuit responsive only to the second electric pulse of each of said pairs thereof applied to the input of said first-pulse deletion circuit, means including a bistable multivibrator having first and second inputs and a common output for providing an electric pulse whose duration is proportionally related to the time interval between the respective pulses of a pair of pulses applied to the first and second inputs, respectively, said trigger circuit output and said first pulse deletion circuit output being coupled to said first and second multivibrator inputs, respectively, whereby the output of said bistable multivibrator includes successive control pulses each having a duration corresponding to the time interval between the first and second electric pulses of corresponding pairs of said electric pulses transmitted from the subsurface logging instrument over said transmission line to the surface signal translation equipment, an oscillator having an output, a recorder having an input, gating means including a normally closed gating circuit for coupling said oscillator output to said recorder input, said gating means further including a gate control input coupled to the output of said bistable multivibrator and responsive to the gate control pulses received therefrom for controlling the opening of said gating means as a function of the duration of the time interval between the respective electric pulses of successive pairs thereof.

References Cited in the file of this patent

UNITED STATES PATENTS

| | | |
|---|---|---|
| 2,841,778 | Ball et al. | July 1, 1958 |
| 2,931,455 | Loofburrow | Apr. 5, 1960 |
| 2,949,973 | Broding et al. | Aug. 23, 1960 |
| 3,018,839 | Isaacson | Jan. 30, 1962 |